United States Patent [19]

Federau et al.

[11] Patent Number: 5,839,113
[45] Date of Patent: Nov. 17, 1998

[54] METHOD AND APPARATUS FOR RATING GEOGRAPHICAL AREAS USING METEOROLOGICAL CONDITIONS

[75] Inventors: Douglas L. Federau, East Lansing; William L. Fringer; Frederick High, both of Kemos, all of Mich.

[73] Assignee: Okemos Agency, Inc., Okemos, Mich.

[21] Appl. No.: 740,505

[22] Filed: Oct. 30, 1996

(Under 37 CFR 1.47)

[51] Int. Cl.$^6$ .................................................. G06F 19/00
[52] U.S. Cl. ............................................................. 705/4
[58] Field of Search ........................... 702/3, 4, 15; 705/4

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,590,983 | 5/1986 | Bennett et al. . |
| 4,595,982 | 6/1986 | Burt . |
| 4,598,367 | 7/1986 | DeFrancesco et al. . |
| 4,622,013 | 11/1986 | Cerchio . |
| 4,642,768 | 2/1987 | Roberts . |
| 4,648,044 | 3/1987 | Hardy et al. . |
| 4,658,370 | 4/1987 | Erman et al. . |
| 4,674,044 | 6/1987 | Kalmus et al. . |
| 4,722,055 | 1/1988 | Roberts . |
| 4,766,539 | 8/1988 | Fox . |
| 4,831,526 | 5/1989 | Luchs et al. . |
| 4,975,840 | 12/1990 | DeTore et al. . |
| 5,491,629 | 2/1996 | Fox et al. ..................................... 702/3 |
| 5,521,813 | 5/1996 | Fox et al. ..................................... 705/8 |

OTHER PUBLICATIONS

DeMott, John S., "Special Coverage for Special Risks", Nation's Business, vol. 83, Iss. 6, Jun. 1994, 6 page copy of article.

Rand, Ted, "The Weather Bookies", Insurance Review, vol. 52, No. 10, Oct. 1991, p. 55(4), 3 page copy of article.

*Primary Examiner*—Donald E. McElheny, Jr.
*Attorney, Agent, or Firm*—Mary M. Moyne; Ian C. McLeod

[57] ABSTRACT

A method and apparatus for rating geographical areas based on the severity and/or frequency of different meteorological conditions. To determine the rating of a geographical area, raw data information from meteorological charts is gathered. The raw data scale for each meteorological condition is divided into ranges. The distribution of the geographical areas over the entire scale is determined. Individual rating factors are assigned to each of the ranges based on the distribution of the geographical areas throughout the scale. The individual rating factors are preferably selected such that the incremental change in the individual rating factors between ranges is preferably proportional to the incremental change in the number of geographical areas between the same ranges. All the individual rating factors for a single geographical area are used to calculate a cumulative rating factor for the geographical area. The cumulative rating factors of all the geographical areas are compared to provide a ranking of the geographical areas. The ranking relates to the risk potential in each geographical area based on the meteorological conditions. The resulting ranking of geographical areas is used to determine the insurability of a structure in a geographical area.

45 Claims, 22 Drawing Sheets

Microfiche Appendix Included
(3 Microfiche, 149 Pages)

*CLIMATOLOGICAL RANKING*

Each weather condition, namely Earthquake, Hurricane, Lightning, Tornado and Wind has been rated by degree of severity and/or frequency.

Each individual ranking was combined to provide an overall "RANKING". The County Level Climatological Data Screen therefore shows this "Ranking" factor.

The summary information for the U.S. is as follows:

1. There are 261 Counties with a ranking under 0.
2. There are 726 Counties with a ranking between 0 and .099.
3. There are 1,523 Counties with a ranking between .1 and .75.
4. There are 176 Counties with a ranking between .76 and 1.0.
5. There are 286 Counties with a ranking between 1.001 and 3.0.
6. There are 101 Counties with a ranking between 3.001 and 7.0.
7. There are 18 Counties with a ranking between 7.001 and 10.0.
8. There are 10 Counties with a ranking greater than 10.001.

The last 129 counties out of 3,101 have the worst weather ranking. Review each weather condition with ranking for full evaluation.

*WeatherTrends Help File*

Overview

Introducing WeatherTrends

Navigating Thru WeatherTrends

Navigating WeatherTrends

Tornadoes

Tornadoes

Hurricanes

Hurricanes

Lightning

Lightning

Wind

Wind

Earthquake

Earthquake

Terrain

Terrain

Freeze Days

Freeze Days

Climatological Ranking

Climatological Ranking

WeatherTrends Overview

The Insurance Weather Data Source ™

PROPERTY UNDERWRITING RESULTS WILL BE IMPROVED.

CAT LOSSES WILL BE REDUCED OR EVEN ELIMINATED.

REINSURANCE COST WILL BE REDUCED.

Earthquake and weather related catastrophes add several points to the loss ratio of property casualty insurers and reinsurers.

With todays technology, we can now assist you in risk selection, rating, and total exposure control.

We have created a program whereby each of the 3,101 counties in the United States has been evaluated for the following weather conditions:

| | |
|---|---|
| *lightning | *temperature |
| *wind | *hurricanes |
| *tornadoes | *earthquakes |

For each county, the climatological conditions have been weighed by frequency and severity, and ranked in relation to all other counties. In addition, the program can provide total gross and net limits, and a listing of all properties your company insures within each county or zipcode.

This data has never been available by county or in a single format. It is a valuable underwriting tool which will greatly improve your performance.

If the programs potential interests you, please contact us at the above address, return the enclosed postcard, or call 1-800-968-5432 for a demonstration.

FIG. 15

 *Navigating Through WeatherTrends*

GENERAL INSTRUCTION

The WeatherTrends program is set up to operate in a Windows environment. To highlight screen options use one of the following methods:

1. place the mouse button on the option and click the left mouse button once;
2. use the UP and DOWN arrow keys;
3. use the TAB key;

To select a screen option, either press the ENTER/RETURN key or double click the left mouse button.

The next section will explain all symbols used when operating the WeatherTrends program.

 *NEW*
    This will add a new account/client record to the client database.

 *DELETE*
    This will delete or remove an account/client record from the client database.

 *TOP*
    This will advance you to the top of the client or county record listing.

 *NEXT*
    This will advance you to the next client or county record.

 *PREV*
    This will advance you to the previous client or county record.

 *END*
    This will advance you to the end of the client or county record listing.

 *FIND*
    This will pull up a search screen utility.

 *EXIT*
    This will exit the screen the user is currently using.

 *RETURN*
    This will return the user to the previous screen.

FIG. 16

 TORNADOES

Tornadoes are based on a scale of 0 - 9 tornadoes in a given county per 10,000 square miles, averaged over the past ten years. The " County Level Climatological Data Screen " shows the scale ranking for that county.

The scale is as follows:

| CLASS | DESCRIPTION |
|-------|-------------|
| 1. | .0 - .5 |
| 2. | .6 - .9 |
| 3. | 1.0 - 2.9 |
| 4. | 3.0 - 4.9 |
| 5. | 5.0 - 6.9 |
| 6. | 7.0 - 8.9 |
| 7. | 9.0 - and above |

The U.S. counties with the highest exposure to tornadoes are in Oklahoma and Texas. The counties with the least exposure to tornadoes are west of the Rockies in the northwest corner, and most counties across the top of the U.S.

FIG. 17

HURRICANES

The "County Level Climatological Data Screen" shows the number of hurricanes that have effected a particular county since 1899. Making Reference to the Saffir/Simpson hurricane scale, hurricanes are classified as follows:

| CLASS | WINDS | DESCRIPTION |
|---|---|---|
| C-1 | 74 - 95 M.P.H. | No damage to structures. |
| C-2 | 96 - 110 M.P.H | Minor damage to structures. |
| C-3 | 111 - 130 M.P.H | Moderate damage to structures. Storm surge up to 6 miles inland. |
| C-4 | 131 - 155 M.P.H | Severe damage to structures. Storm surge up to 8 miles inland. |
| C-5 | 156 - And Up | Major damage to structures. Storm surge up to 10 miles inland. |

Prior to 1994, of the hurricanes that hit the East coast and the Golf Stream areas of the United States, there were 38 classified as a C-4, and 60 classified as C-3.. It is important to note that damage as a result of surge can easily exceed the damage resulting from excessive peak winds.

FIG. 18

 LIGHTNING

Lightning is determined by computing the number of thunderstorm days per year. The " County Level Climatological Data Screen " shows the class of that county. The scale is as follows:

| CLASS | DESCRIPTION | |
|---|---|---|
| 1 | 0 - 10 | Thunderstorm days per year |
| 2 | 11 - 20 | Thunderstorm days per year |
| 3 | 21 - 30 | Thunderstorm days per year |
| 4 | 31 - 40 | Thunderstorm days per year |
| 5 | 41 - 50 | Thunderstorm days per year |
| 6 | 51 - 60 | Thunderstorm days per year |
| 7 | 61 - 70 | Thunderstorm days per year |
| 8 | 71 - 80 | Thunderstorm days per year |
| 9 | 81 - 90 | Thunderstorm days per year |
| 10. | 91 - 100 | Thunderstorm days per year |
| 11. | 101 - 110 | Thunderstorm days per year |

The counties with the most frequent lightning in the U.S. are all located in Florida. All nine counties have in excess of 110 thunderstorm days per year.

FIG. 19

 WIND

Wind categories represent the peak wind speeds over the past ten years. The " County Level Climatological Data Screen " shows the peak wind for the selected county.

Wind speed categories are as follows:

| CLASS | DESCRIPTION |
|---|---|
| 1. | 0 - 70 MPH |
| 2. | 75 - 79 MPH |
| 3. | 80 - 84 MPH |
| 4. | 85 - 89 MPH |
| 5. | 90 - 94 MPH |
| 6. | 95 - 99 MPH |
| 7. | 100 - 104 MPH |
| 8. | 105 - 109 MPH |
| 9. | 110 - 114 MPH |
| 10. | 115 - and over |

The counties in the U.S. with the highest peak winds are all situated on the southern tip of Florida. All have peak winds that exceeded 115 MPH.

FIG. 20

 *EARTHQUAKE*

Earthquake zones have been established based on several hundred years of history and geologic information on large prehistoric earthquakes.

Zone describes potential for frequent damaging earthquake shaking. The " County Level Climatological Data Screen " shows the zone for that county. Zone intensity is described as follows:

| ZONES | DESCRIPTION |
|---|---|
| Zone 0 | Seismic potential is not expected. |
| Zone 1 | Minor seismic potential is expected. |
| Zone 2 | Moderate seismic potential is expected. |
| Zone 3 | Major seismic potential is expected. |

FACTORS TO BE CONSIDERED:

1. Proximity to a fault rupture will directly affect damage potential.
2. Ground motion is produced at substantial distances from faults.
3. Frame construction is more resistant than unreinforced masonry.
4. Older structures usually have missing or deteriorated ties to foundation.

FIG. 21

 TERRAIN

F Flat Land. Characterized by changes in ground elevation above mean sea level of 1000 feet or less in a 20 mile radius.

R Rolling. Characterized by changes in ground elevation above mean sea level of up to 1000 feet over a 20 mile radius.

H Hilly. Characterized by changes in ground elevation above mean sea level of up to 2000 feet in a 20 mile radius.

M Mountainous. Characterized by changes in ground elevation of up to 1000 feet in a six mile radius.

T High Mountainous. Characterized by drastic changes in ground elevation of up to 5000 feet in a 20 mile radius.

FIG. 22

*FREEZE DAYS*

The number of freezing days per year, for each county where the temperature was 32 degrees or lower.

Freeze Day categories are as follows:

| CLASS | DESCRIPTION |
|---|---|
| 1. | 5 - 10 days |
| 2. | 11 - 20 days |
| 3. | 21 - 30 days |
| 4. | 31 - 60 days |
| 5. | 61 - 90 days |
| 6. | 91 - 120 days |
| 7. | 121 - 150 days |
| 8. | 151 - 180 days |
| 9. | 181 - 210 days |
| 10. | 211 - 240 days |
| 11. | 241 - 270 days |

More than 270 days per year per county below freezing.

 CLIMATOLOGICAL RANKING

Each weather condition, namely Earthquake, Hurricane, Lightning, Tornado and Wind has been rated by degree of severity and/or frequency.

Each individual ranking was combined to provide an overall "RANKING". The County Level Climatological Data Screen therefore shows this "Ranking" factor.

The summary information for the U.S. is as follows:

1. There are 261 Counties with a ranking under 0.

2. There are 726 Counties with a ranking between 0 and .099.

3. There are 1,523 Counties with a ranking between .1 and .75.

4. There are 176 Counties with a ranking between .76 and 1.0.

5. There are 286 Counties with a ranking between 1.001 and 3.0.

6. There are 101 Counties with a ranking between 3.001 and 7.0.

7. There are 18 Counties with a ranking between 7.001 and 10.0.

8. There are 10 Counties with a ranking greater than 10.001.

The last 129 counties out of 3,101 have the worst weather ranking. Review each weather condition with ranking for full evaluation.

FIG. 24

METHOD AND APPARATUS FOR RATING GEOGRAPHICAL AREAS USING METEOROLOGICAL CONDITIONS

MICROFICHE APPENDIX

This application has 2 microfiche appendixes. Microfiche Appendix A has 2 microfiche with 89 total number of frames. Microfiche Appendix B has 1 microfiche with 60 total number of frames.

BACKGROUND OF THE INVENTION

1. Field of the Invention

The present invention relates to a method and apparatus for rating geographical areas based on the severity and/or frequency of different meteorological conditions in the areas. In particular, the present invention relates to calculating individual rating factors for each meteorological condition for each geographical area based on the severity and/or frequency of the meteorological condition in that area and determining a cumulative rating factor for each geographical area which reflects the severity and/or frequency of all the meteorological conditions in the geographical area. The cumulative rating factor reflects the amount of risk potential in the geographical area as a result of meteorological conditions. The ratings are preferably used to determine the level or amount of insurability of physical structures in a specific geographical area.

2. Description of the Related Art

In the past, various methods have been used to determine the rating of a given geographical area by considering different meteorological conditions. The problem however, was that the severity and/or frequency of the various meteorological conditions for the geographical areas were all reported on different maps or charts. In addition, the methods used to determine the severity and/or frequency of each meteorological condition were all different. Therefore, the data corresponding to one meteorological condition could not be compared to the data corresponding to another meteorological condition. Consequently, it was difficult to determine the overall effect of all the meteorological conditions in the geographical area. In addition, there was no easy and quick way to relate the effect of the meteorological conditions in one geographical area with the effects of the same meteorological conditions in another geographical area.

The related art has described a different method and apparatus for determining insurability based on potential risk. In particular, U.S. Pat. No. 4,975,840 to DeTore et al describes a method and apparatus for evaluating the insurability of a potentially insurable risk. The preferred embodiment of the invention covers use of the method to evaluate risk associated with life and health insurance. However, the method may be adapted for use in other fields such as the underwriting of property and casualty insurance risks. The apparatus is used throughout the entire underwriting process. In addition, the apparatus is able to conduct the underwriting analysis or the user can override the system and conduct the analysis himself.

Further, U.S. Pat. No. 4,766,539 to Fox describes a system and method for writing a policy insuring against the occurrence of a specified weather condition. The system and method uses a computer to allow the user to determine the premium for and write a policy insurance in an amount against occurrence of a specified weather condition in a given location during a given time period. A digital computer is provided with data about weather conditions in the given location during predetermined time intervals in a predetermined number of years. The computer is then supplied with identification of the specified weather condition against which the policy is to insure and the amount of insurance to be provided by the policy. The computer determines the number of occurrences of the specified weather condition in the given location during the time intervals and calculates the pure loss ratio for the policy. The policy is then written insuring in the amount against the specified weather condition occurring in the given location during the given time period, with the policy being written at the premium as calculated by the computer. For program coverage, the pure loss ratio must be determined from the pure loss ratios for each triggered refund amount at each geographic location covered by the policy. The invention only deals with a single, specific weather event.

Also of some interest are U.S. Pat. Nos. 4,346,442 to Musmanno; 4,376,978 to Musmanno; 4,591,983 to Bennett et al; 4,595,982 to Burt; 4,598,367 to DeFrancesco et al; 4,622,013 to Cerchio; 4,642,768 to Roberts; 4,648,044 to Hardy et al; 4,658,370 to Erman et al; 4,674,044 to Kalmus et al; 4,722,055 to Roberts; 4,766,539 to Fox and 4,831,526 to Luchs et al There remains a need for a quick and easy method and apparatus for determining the rating of a geographical area with respect to other geographical areas based on a diverse set of meteorological conditions.

OBJECTS

It is therefore an object of the present invention to provide a method and apparatus for rating geographical areas based on the severity and/or frequency of several meteorological conditions. Further, it is an object of the present invention to provide a method and apparatus for providing a rating of geographical areas for use in determining the insurability of a physical structure located in a geographical area. Further, it is an object of the present invention to provide a method and apparatus for converting unrelated data regarding the severity and/or frequency of different meteorological conditions for use in an equation to produce related ratings for geographical areas. Still further, it is an object of the present invention to provide a method and apparatus for quickly and easily determining the risk potential in a specific geographical area as a result of different meteorological conditions.

BRIEF DESCRIPTION OF THE DRAWINGS

FIGS. 14 to 25 are help screens created by the meteorological condition information system 100.

DETAILED DESCRIPTION OF THE PREFERRED EMBODIMENTS

Figure 1:
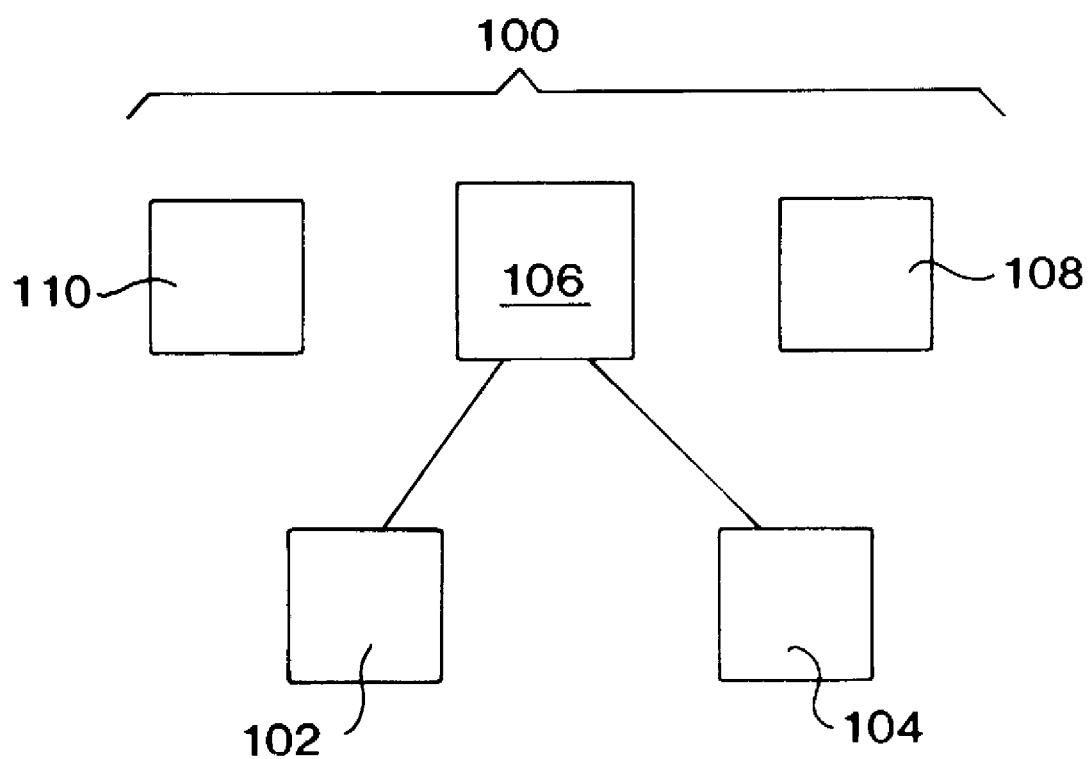
FIG. 1 is a schematic representation of the meteorological condition information system 100 showing the input device 102, the output device 104, the central processing unit 106 and the different storage media 108 and 110.

The present invention relates to a method for ranking geographical areas based on a plurality of meteorological conditions, which comprises: providing a meteorological chart of the geographical areas for each of the meteorological conditions to be ranked, each chart showing a severity and/or frequency of the meteorological condition in each of the geographical areas; selecting ranges of the severities and/or frequencies of the meteorological condition for all of the geographical areas; calculating rating factors for each of the ranges of severities and/or frequencies of the meteorological condition; determining the individual rating factor for each of the geographical areas for each of the meteorological conditions; calculating a cumulative rating factor for each of the geographical areas using the individual rating factors for each of the meteorological conditions for the geographical area; and ranking the geographical areas based on the cumulative rating factors of each of the geographical areas.

Further, the present invention relates to a method for determining the insurability of a physical structure located in a geographical area, which comprises: providing a rating database in a computer having a cumulative rating factor for a plurality of geographical areas wherein the cumulative rating factor is calculated using the equation $$R_N = X_W F_N(W) + X_T F_N(T) + X_L F_N(L) + X_E F_N(E) + X_H F_N(H)$$

wherein N is the geographical area $R_N$ is the cumulative rating factor for the geographical area, $F_N(W)$ is a wind rating factor for the geographical area, $F_N(T)$ is a tornado rating factor for the geographical area, $F_N(L)$ is a lightning rating factor for the geographical area, $F_N(E)$ is the earthquake rating factor for the geographical area, $F_N(H)$ is a hurricane rating factor for the geographical area and wherein $X_W$, $X_T$, $X_L$, $X_E$, and $X_H$ are weighting factors for each of the meteorological condition; accessing the rating database to retrieve the cumulative rating factor for the geographical area; providing a rating chart showing the insurability for the cumulative rating factors; and comparing the cumulative rating factor for the geographical area with the rating chart to determine the insurability of the structure located in the geographical area.

Still further, the present invention relates to a method for determining the insurability of a physical structure located in a geographical area from a database, which comprises: providing a plurality of charts, each chart having information relating to a severity and/or frequency of a meteorological condition for a plurality of geographical areas; selecting a range of rating factors representing the severities and/or frequencies of each meteorological condition for the plurality of geographical areas; calculating a rating factor for each geographical area for each meteorological condition; combining the rating factors for each of the meteorological conditions for each of the geographical areas to provide a cumulative rating factor for each of the geographical areas; inputting the geographical areas and the corresponding cumulative rating factors into a computer to form the database; forming a chart showing an amount of insurability for the cumulative rating factors; retrieving the cumulative rating factor from the database for the geographical area where the structure is located; and comparing the cumulative rating factor for the geographical area with the chart to determine the amount of insurability for the geographical area.

Further still, the present invention relates to a media operational for use in storing a database for use in a method for determining the insurability of a physical structure located in a geographical area, which comprises: providing a database on the media having a cumulative rating factor for a plurality of geographical areas wherein the cumulative rating factor is calculated using the equation $$R_N = X_W F_N(W) + X_T F_N(T) + X_L F_N(L) + X_E F_N(E) + X_H F_N(H)$$

wherein N is the geographical area $R_N$ is the rating factor for the geographical area, $F_N(W)$ is a wind rating factor for the geographical area, $F_N(T)$ is a tornado rating factor for the geographical area, $F_N(L)$ is a lightning rating factor for the geographical area, $F_N(E)$ is the earthquake rating factor for the geographical area, $F_N(H)$ is a hurricane rating factor for the geographical area and $X_W$, $X_T$, $X_L$, $X_E$ and $X_H$ are weighting factors for each of the meteorological conditions; accessing the database to retrieve the cumulative rating factor for the geographical area; providing a rating chart showing the insurability for the cumulative rating factors; and comparing the cumulative rating factor for the geographical area with the rating chart to determine the insurability of the structure located in the geographical area.

In the following description, the following definitions apply:

Meteorological Condition—any condition which is not directly controlled by mankind which can effect geographical areas. Examples of meteorological conditions are: wind, precipitation, temperature, freeze days, terrain, earthquake, tornadoes, hurricanes and lightning.

Raw Data Information—information or data directly corresponding to the frequency and/or severity of the meteorological condition. The form of the data is usually different for each meteorological condition.

Gross Liability—total monetary exposure an insurance company has for a given geographical area.

Net Liability—gross liability minus the amount of reinsurance the insurance company has for the given geographical area.

FIG. 1 shows the meteorological condition information system 100 for use in rating geographical areas N based on the severity and/or frequency of different meteorological conditions. The system 100 is preferably similar to standard computer systems and includes a central processing unit 106, storage media 108 and 110, an input device 102 and an output device 104. The storage media 108 and 110 can be any of a well known type such as hard drives, CD roms, disks tapes. In the preferred embodiment, there are two storage medias 108 and 110. The first storage media 108 contains the meteorological condition information database and the program for implementing the method of determining the rating of geographical area N. The second storage media contains the client information database and the liability database. The input device 102 can be of any type well known in the art such as a keyboard. In addition, several input devices 102 may be used. The output device 104 is preferably a computer monitor although the output device 104 could also include a printer. The central processing unit 106 is preferably a standard PC computer which runs the computer program which allows the user to use the input device 102 to access the storage media 108 and 110 and retrieve information from the storage media 108 and 110 and display that information on the output device 104. The system 100 could also be a LAN system which uses a central processing unit and several different sets of input and output devices 102 and 104.

In the preferred embodiment, the storage media 108 and 110 contain a meteorological condition information database, a client information database and a liability database. The meteorological condition information database contains raw data information representing the severity and/or frequency of each meteorological condition for each geographical area N as well as the cumulative rating factor for each geographical area N (to be described in detail hereinafter). The meteorological condition information database is included as Appendix A. In the preferred embodiment, the raw data information in the meteorological condition information database represents the average severity and/or frequency of the meteorological condition over a given time period for the given geographical area N. In the preferred embodiment, the geographical areas N are counties in the United States. There are 3101 counties in the United States. However, the geographical area N can be selected in any way such as by zip code provided the geographical areas N are the same for all the meteorological conditions. In the preferred embodiment, the meteorological conditions which are represented in the meteorological condition information database and are used to calculate the cumulative rating factors R are wind speed, tornadoes, lightning, earthquakes and hurricanes. However, other meteorological conditions can also be included such as a precipitation, temperature, terrain and freeze days. Preferably the meteorological condition information database is updated at least annually such that the meteorological condition information database represents the current effect of the meteorological conditions on the geographical areas N. The raw data information in the meteorological condition information database is compiled from charts which are derived from existing meteorological charts, maps, books and other data sources showing the severity and/or frequency of the particular meteorological condition for the various geographical areas N over a selected time frame (FIGS. 2 to 6). Each chart shows a different meteorological condition. In the preferred embodiment, the charts are in the form of maps having different colors representing the different ranges of the meteorological condition. The charts for the different meteorological conditions are unrelated. The charts use different methods and different variables to categorize the severity and/or frequency of the meteorological condition.

To create the meteorological condition information database, the raw data information representing the severity and/or frequency of each meteorological condition is retrieved from the charts. The raw data information obtained from the charts for each meteorological condition is unrelated to the raw data information obtained from other charts for the other meteorological conditions. The entire raw data severity and/or frequency scale for each specific meteorological condition is then classified into ranges. In the preferred embodiment, for certain meteorological conditions, outlying geographical areas N such as those geographical areas N which are not effected by the particular meteorological condition or geographical areas N which are unusually effected by the meteorological condition are not calculated into the ranges. Usually, the outlying geographical areas N represent geographical areas N which are uneffected by the meteorological condition. By removing outlying geographical areas N, the ranges are more evenly representative of the actual range of severity and/or frequency of the meteorological conditions. Once the ranges are selected, the ranges are then assigned an individual rating factor $F_N()$. The individual rating factors $F_N()$ are selected based on the distribution of geographical areas N over the entire scale of the raw data information for the specific meteorological condition. In the preferred embodiment, the individual rating factors $F_N()$ are selected such that the incremental change in the individual rating factors $F_N()$ between the ranges is proportional to the incremental change in the number of geographical areas N between the ranges. The individual rating factor $F_N()$ for each geographical area N for each meteorological condition is determined by determining within which range the geographical area N is located based on the charts. Each geographical area N has a separate individual rating factor $F_N()$ for each meteorological condition. Preferably, the individual rating factors $F_N()$ for each meteorological condition are not related or dependent upon the individual rating factors $F_N()$ for the other meteorological conditions. However, the individual rating factors $F_N()$ for a specific meteorological condition for all the counties N are related and interdependent. The interdependency of the individual rating factors $F_N()$ for a single meteorological condition allows the individual meteorological conditions to be represented the same for all geographical areas N. All the individual rating factors $F_N()$ for a single meteorological condition are then calculated together to provide the cumulative rating factor R for the geographical area N. The computer program for determining the individual meteorological condition rating factor and the cumulative rating factor R for each geographical area N is included as part of the specification. The raw data information for each meteorological condition in each geographical area N and the cumulative rating factor R for each geographical area N are used to form the meteorological condition information database. In the preferred embodiment, the individual rating factors $F_N()$ for each meteorological condition are not included in the meteorological information database. However, the individual rating factors $F_N()$ could be included instead of or along with the raw data information on the meteorological condition for the geographical areas N. In the preferred embodiment, the computer program for determining the individual rating factors is not included in the storage media 108 or 110 of the system 100. However, the program can be included on the same storage media 108 as the meteorological condition information database. In the preferred embodiment, the calculation of the individual rating factors and the cumulative rating factor R for each geographical area N for each meteorological condition is completed separately using another computer system (not shown).

Figure 2:
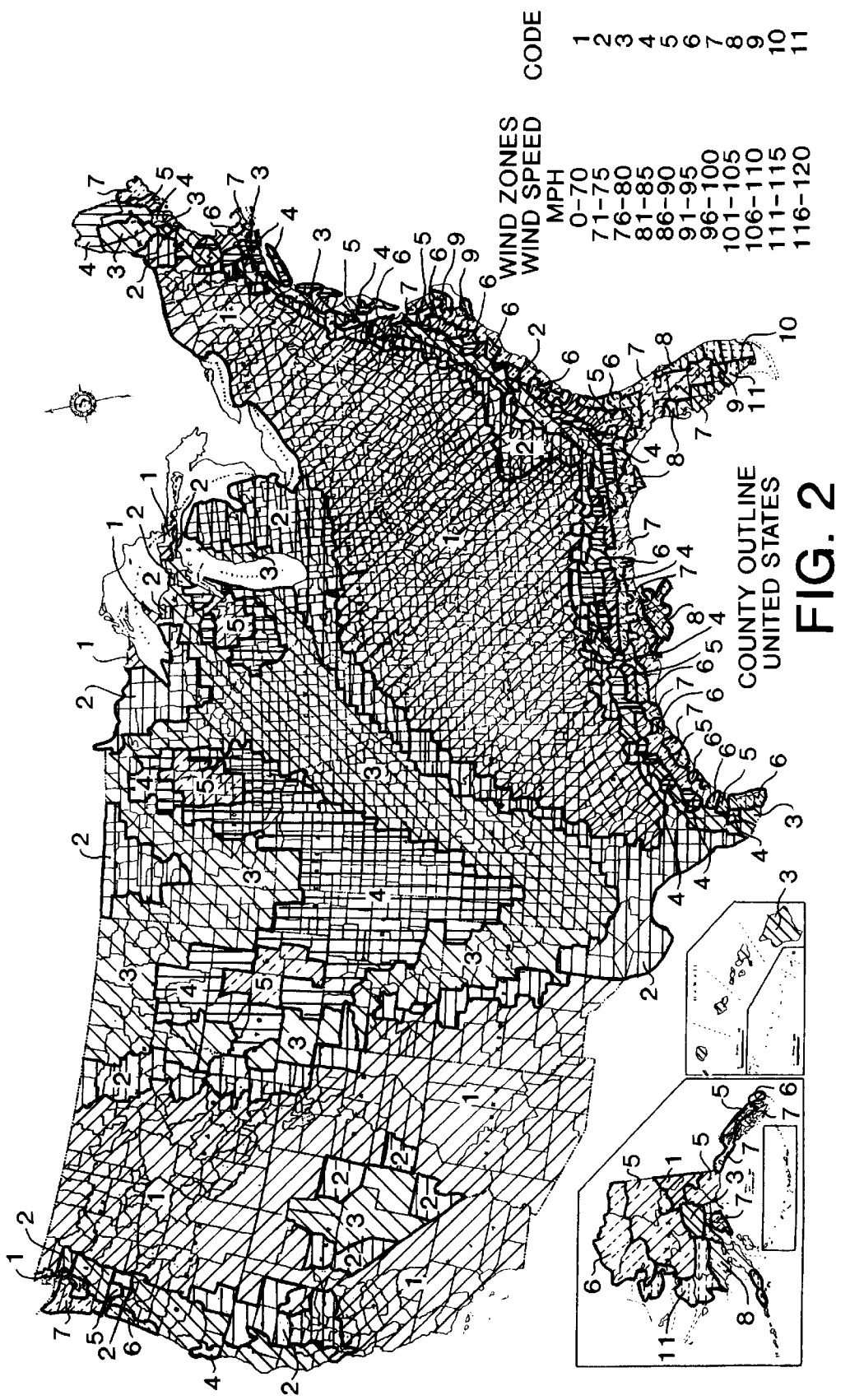
FIG. 2 is a meteorological chart showing wind speeds in the counties N of the United States.

In the preferred embodiment, to determine the individual wind speed rating factor for the geographical areas or counties N, the normal distribution of the counties N over the raw data wind speed scale is first calculated. The chart for wind speed shows each county's peak wind speeds over the previous 10 years in miles per hour (MPH) (FIG. 2). The method for calculating wind speed to produce the chart is the Electronic Industry Association (EIA) and is the current standard used to represent wind speed in the United States.

The scale of wind speeds extends from 0 to about 140 MPH which represents the raw data wind speed scale. However, there are no counties N currently having a wind speed of greater than 120 MPH. Wind speeds less than or equal to 70 MPH are considered negligible due to the negligible damage caused by winds of less than or equal to 70 MPH. Therefore the counties N, approximately 1388, having wind speeds of less than 70 MPH are considered outlying counties N and are grouped together. These counties N are not considered when the normal distribution of counties N over the raw data wind speed scale is calculated. The raw data wind speed scale is divided into ranges. The individual wind speed rating factors are assigned to each range of the raw data wind speed scale. The individual wind speed rating factors are selected such that the incremental change in the individual wind speed rating factors between the ranges is proportional to the incremental change in the number of the counties N between the ranges. The individual wind speed rating factors range between −0.056 and 6.002. The average wind speed for all the counties N is 76.7 MPH which corresponds to an individual wind speed rating factor of 0.056. The counties N having wind speeds of less than or equal to 70 MPH receive the individual wind speed rating factor of −0.056. The raw data wind speed rating for each county N is retrieved from the charts and each county N is assigned an individual wind speed rating factor. Table 1 below shows the ranges of the raw data wind speed scale, the individual wind speed rating factor for each range and the number of counties N in each range.

TABLE 1

WIND SPEED

| WIND SPEED MPH | INDIVIDUAL RATING FACTOR | NUMBER OF COUNTIES |
|---|---|---|
| 0–70 | −0.056 | 1388 |
| 71–75 | 0.000 | 469 |
| 76–80 | 0.056 | 648 |
| 81–85 | 0.069 | 318 |
| 86–90 | 0.083 | 107 |
| 91–95 | 0.166 | 57 |
| 96–100 | 0.332 | 70 |
| 101–105 | 0.664 | 30 |
| 106–110 | 1.328 | 11 |
| 111–115 | 1.994 | 2 |
| 116–120 | 2.660 | 1 |
| 121–125 | 3.316 | 0 |
| 126–130 | 3.982 | 0 |
| 131–135 | 4.648 | 0 |
| 136–140 | 5.314 | 0 |
| >140 | 6.002 | 0 |

Figure 3:
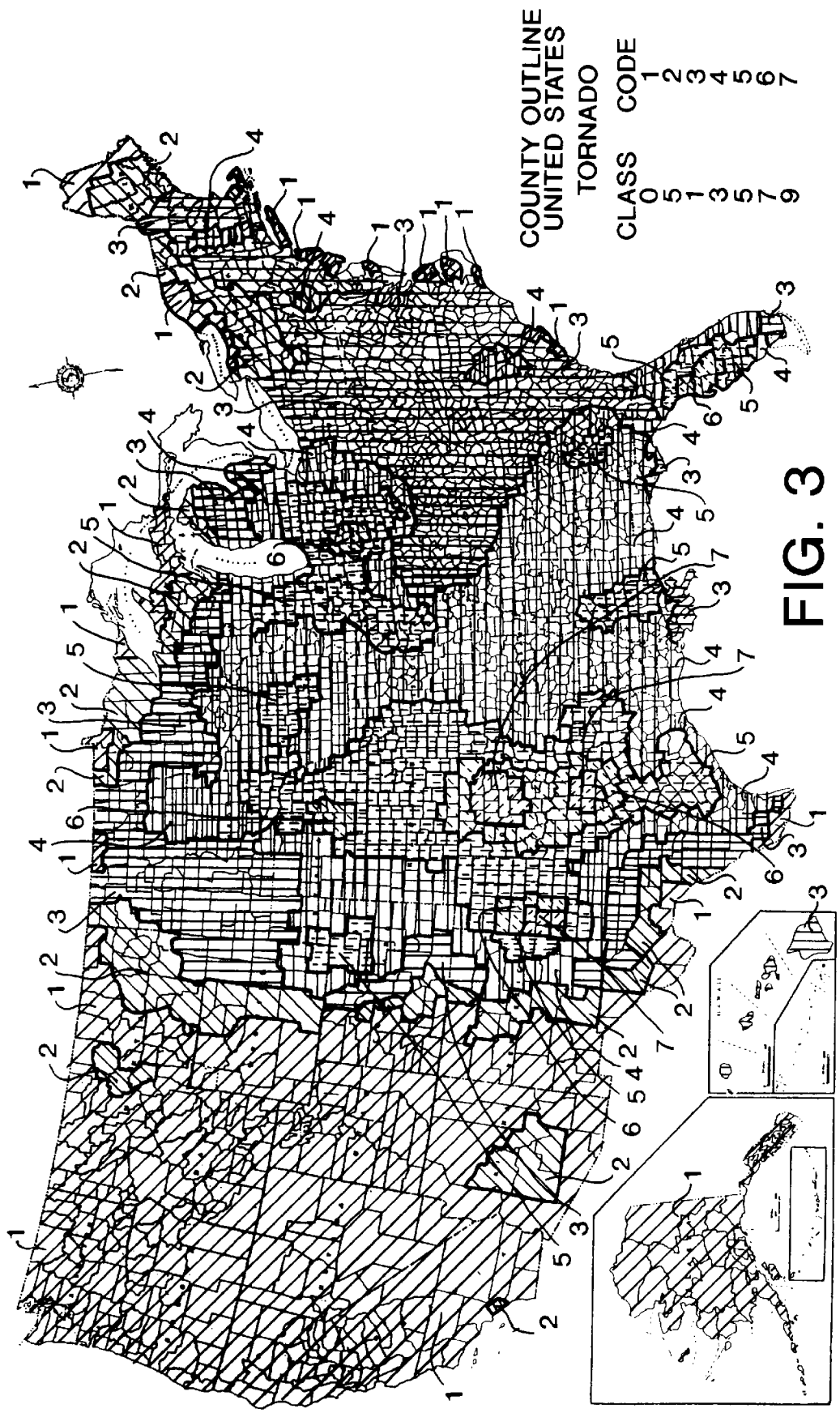
FIG. 3 is a meteorological chart showing tornadoes in the counties N of the United States.

To determine the individual tornado rating factors for the counties N, as with wind speed, in the preferred embodiment, a normalized distribution of the counties N over the raw data tornado scale is calculated. The meteorological chart showing the raw data tornado scale rate the severity and/or frequency of tornadoes based on a scale of 0 to 9 tornadoes in a given county N per 10,000 square miles, averaged over the previous 10 years (FIG. 3). The scale classifies tornadoes into 11 classes (0, 0.5, 1, 2, 3, 4, 5, 6, 7, 8, 9). The classes directly correspond to the number of tornadoes. However, in the current raw data tornado scale none of the counties N have a classification of 2, 4, 6, or 8. However, this may change when the chart is updated. In addition, the computer program is written to allow for decimal error when inputting data. In the preferred embodiment, the computer program would display an error message if appropriate range or class of raw data was not correctly inputted. Preferably, the same type of error detection system would be used as a check for all data input. The outlying counties N which are not effected by tornadoes are not included in the calculation of the distribution of counties N over the raw data tornado scale. The raw data tornado scale is divided into ranges based on the distribution of the counties N over the entire scale. In the preferred embodiment, each raw data class of tornado represents one range. Preferably, an additional class of greater than or equal to 10 is included in order to allow for expansion of the classification in the future. Therefore, currently there are no counties N having a raw data tornado classification of greater than or equal to 10. The individual tornado rating factors are then assigned to each of the ranges. The individual tornado rating factors range between −0.056 and 2.656 and are calculated such that the incremental change in the individual tornado rating factor between ranges is proportional to the incremental change in the number of counties N between the ranges. The raw data tornado classification for each county N is then compared to the ranges to determine the specific individual tornado rating factor for each county N. In the preferred embodiment, counties N least effected by tornadoes receive an individual tornado rating factor of −0.056. The average raw data tornado rating is 2.39 which receives an individual tornado rating factor of 0.056. Table 2 shows the ranges and classes of the raw data tornadoes scale, the individual tornado rating factor for each range and class and the number of counties N in each range and class.

TABLE 2

TORNADOES

| CLASS | TORNADOES | INDIVIDUAL RATING FACTOR | NUMBER OF COUNTIES |
|---|---|---|---|
| 0 | 0.000–0.499 | −0.056 | 400 |
| .5 | 0.500–0.999 | −0.028 | 138 |
| 1 | 1.000–1.999 | 0.000 | 964 |
| 2 | 2.000–2.999 | 0.056 | 0 |
| 3 | 3.000–3.999 | 0.069 | 953 |
| 4 | 4.000–4.999 | 0.083 | 0 |
| 5 | 5.000–5.999 | 0.166 | 526 |
| 6 | 6.000–6.999 | 0.332 | 0 |
| 7 | 7.000–7.999 | 0.644 | 95 |
| 8 | 8.000–8.999 | 1.328 | 0 |
| 9 | 9.000–9.999 | 1.992 | 25 |
| 10 | ≧10.000 | 2.656 | 0 |

Figure 4:
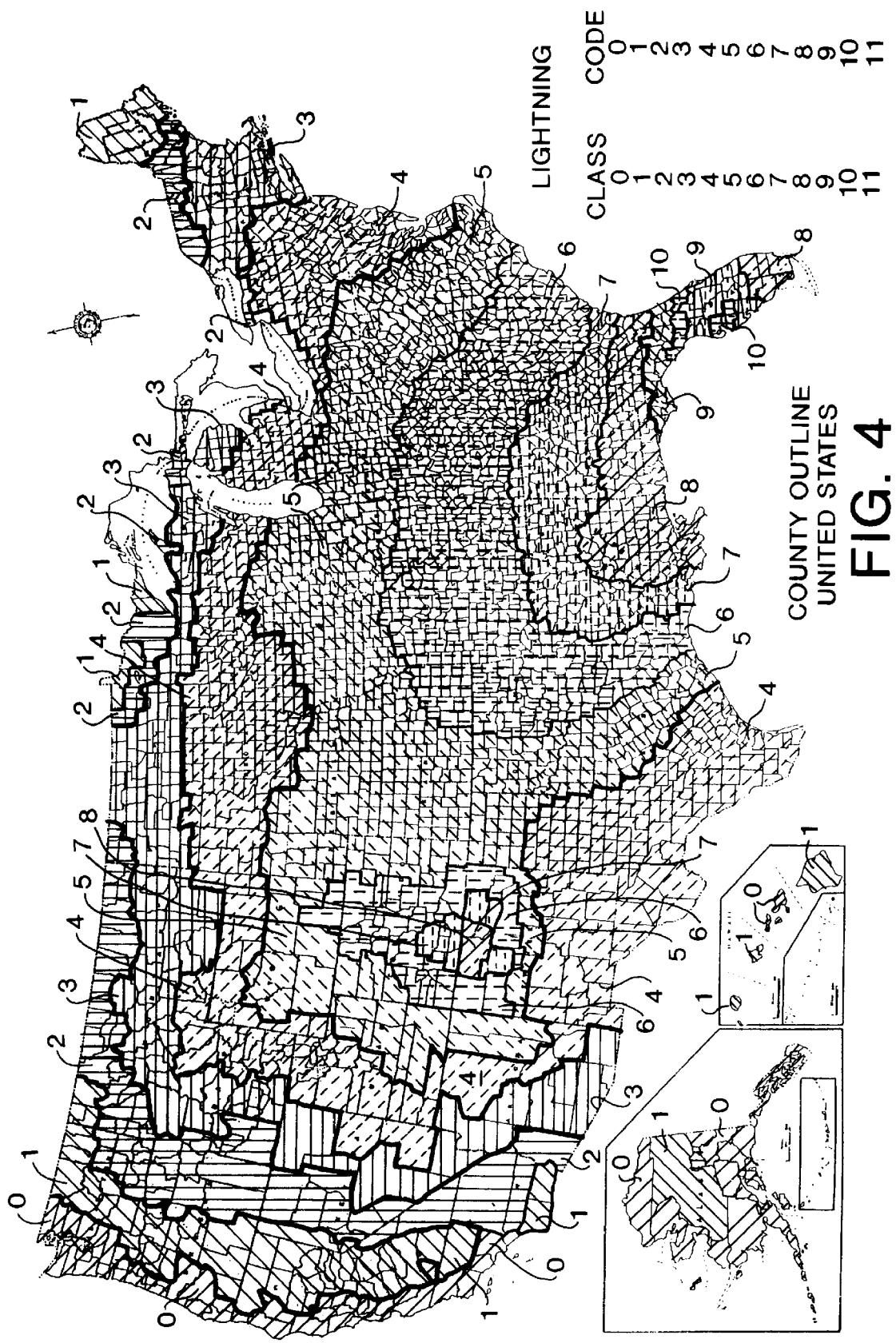
FIG. 4 is a meteorological chart showing lightning in the counties N of the United States.

In the preferred embodiment, the meteorological chart showing the severity and/or frequency of lightning rate the meteorological condition based on the average number of thunderstorm days per year averaged over the previous 10 years (FIG. 4). The number of thunderstorm days per year ranges from 0 to approximately 110 throughout all the counties N in the United States. The number of thunderstorm days per year is divided into twelve (12) ranges. Each range is assigned a raw data lightning class from 0 to 11 (0, 1, 2, 3, 4, 5, 6, 7, 8, 9, 10, 11). The distribution of counties N over the raw data thunderstorm scale is then calculated. Next, each of the raw data thunderstorm ranges is assigned an individual lightning rating factor. Each class represents one range for purposes of assigning the individual lightning rating factors. In the preferred embodiment, the individual lightning rating factors are between −0.056 and 1.157 and are calculated such that the incremental change in the individual lightning rating factor between classes is proportional to the incremental change in the number of counties N between the classes. The specific raw data lightning class of each county N is then used to determine the specific individual lightning rating factor for each county N. Counties N having greater than 110 thunderstorm days per year are outlying counties N and are grouped together in Class 11 which corresponds to an individual lightning rating factor of 1.157. Counties N which are uneffected by lightning are grouped together in Class 0 which corresponds to an individual lightning rating factor of −0.056. In the preferred embodiment, the average raw data lightning class for the counties N is 4.926. Therefore, preferably most counties N will have an individual lightning rating factor of 0.056. Table 3 shows the classes of the raw data thunderstorm scale and the ranges of thunderstorm days per year to which each class corresponds, the individual lightning rating factor associated with each class and the number of counties N in each class.

TABLE 3

LIGHTNING

| CLASS | THUNDERSTORM DAYS PER YEAR | INDIVIDUAL RATING FACTOR | NUMBER OF COUNTIES |
|---|---|---|---|
| 0 | 0–5 | −0.056 | 81 |
| 1 | 6–10 | −0.028 | 80 |
| 2 | 11–20 | −0.028 | 95 |
| 3 | 21–30 | 0.000 | 235 |
| 4 | 31–40 | 0.056 | 600 |
| 5 | 41–50 | 0.069 | 870 |
| 6 | 51–60 | 0.083 | 707 |
| 7 | 61–70 | 0.097 | 229 |
| 8 | 71–80 | 0.111 | 156 |
| 9 | 81–90 | 0.139 | 31 |
| 10 | 91–100 | 1.157 | 8 |
| 11 | 101–110 | 1.157 | 9 |

Figure 5:
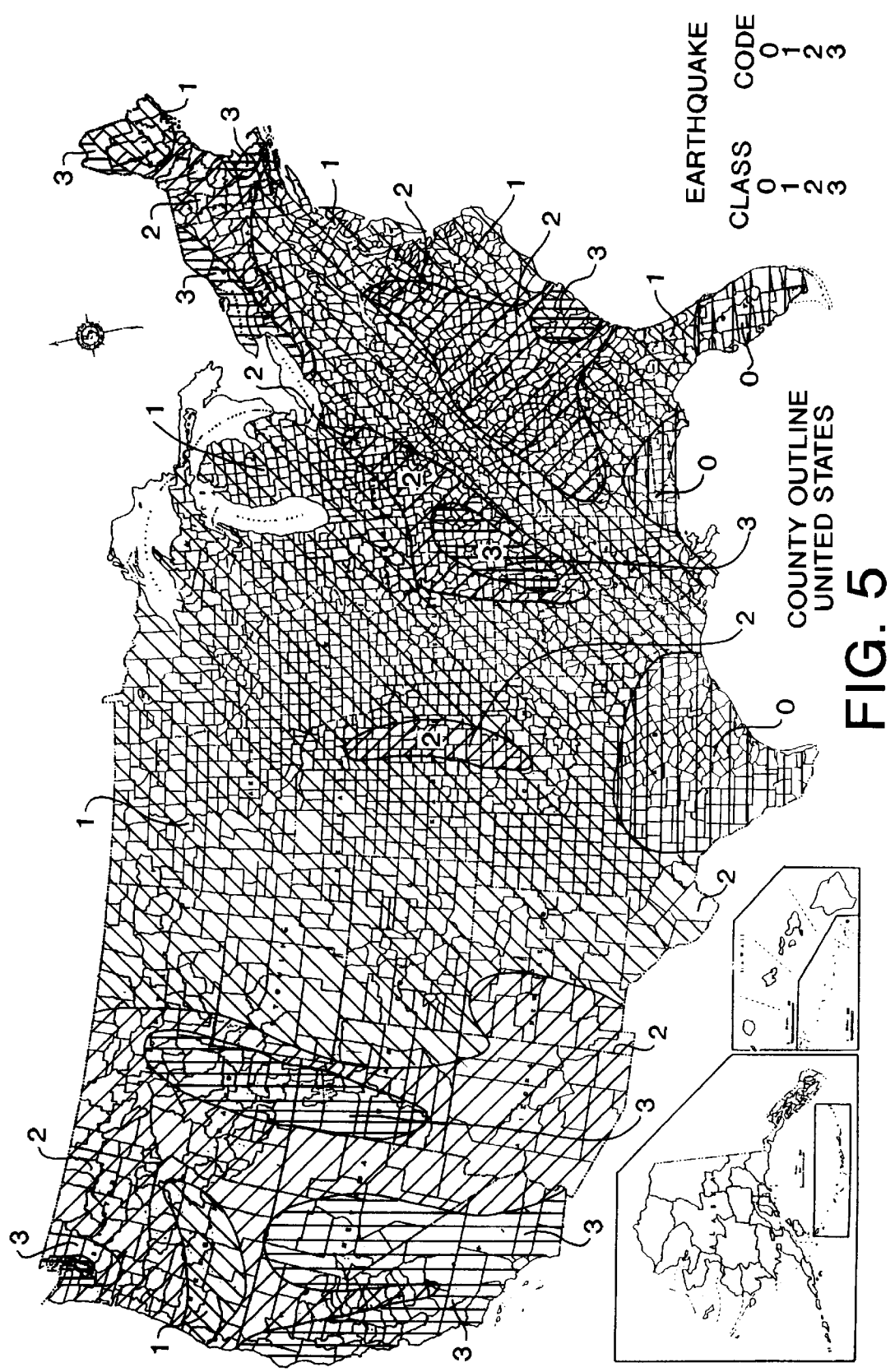
FIG. 5 is a meteorological chart showing earthquakes in the counties N of the United States.
Figure 6:
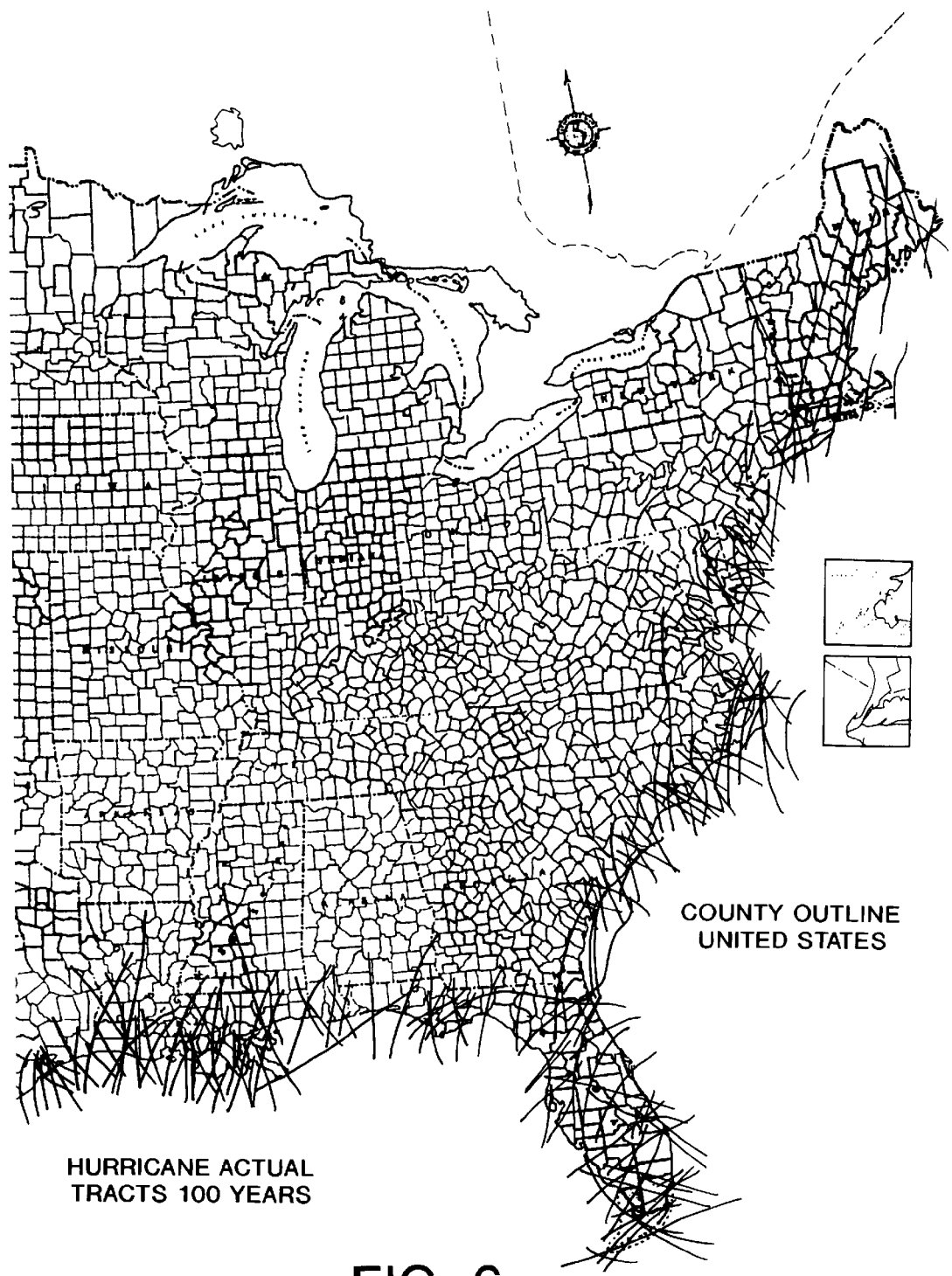
FIG. 6 is a meteorological chart showing hurricanes in the counties N of the United States.

The raw data earthquake scale expresses the severity and/or frequency of earthquakes in zones. The zones have been established based on several hundred years of history and geological information on significant earthquakes and are the standards used to describe the severity and/or frequency of earthquakes. The zones describe different levels of damage potential from earthquakes. There are four zones (0, 1, 2 and 3). Each zone represents one range for determining the individual earthquake rating factors. To determine the individual earthquake rating factor for each county N, the standard distribution of counties N over the raw data scale is first calculated. The individual earthquake rating factor for each zone is calculated such that the incremental change in the individual rating factor $F_N()$ between zones is proportional to the incremental change in the number of counties N between the same zones. A majority of the counties N (1965 of the 3103) have a zone classification of 1 which corresponds to an individual rating factor $F_N()$ of 0.010. The meteorological condition chart showing all the counties N is used to determine the zone for each county N (FIG. 5). Counties N not effected by earthquakes are all given an individual rating factor $F_N()$ of zero (0). Table 4 shows the four zones including a description of the type of earthquake activity anticipated with each zone, the individual earthquake rating factor for each zone and the number of counties N in each zone.

TABLE 4

EARTHQUAKE

| ZONE | INDIVIDUAL RATING FACTOR | NUMBER OF COUNTIES |
|---|---|---|
| 0 - Seismic potential is not expected | 0.000 | 234 |
| 1 - Minor seismic potential is expected | 0.010 | 1965 |
| 2 - Moderate seismic potential is expected | 0.025 | 665 |
| 3 - Major seismic potential is expected | 1.000 | 237 |

The individual hurricane rating factors for hurricanes are determined differently than the previous four meteorological conditions. The computer program (HADD) used for determining the individual hurricane rating factors for each county N is included as part of the specification. In the raw data hurricane scale as derived from the meteorological chart (FIG. 6), individual hurricanes are divided into classes depending upon the severity and/or frequency of the hurricane. These classes are well known and are the standard used for classifying hurricanes. There are five (5) classes (C1, C2, C3, C4 and C5). The meteorological chart showing hurricanes list the number of hurricanes of each different class occurring in each specific county N. Thus, the meteorological chart shows both the frequency and the severity and/or frequency of the hurricanes. To determine the individual hurricane rating factors, each class of hurricane is first assigned a partial rating factor. The partial rating factors preferably range from 0.500 to 2.500 and increase in even intervals of 0.500. Preferably, the selection of the partial rating factors is not based on the distribution of counties N throughout the raw data hurricane scale and is not based on the incremental change in the number of counties N in each class. Table 5 shows the classes of hurricanes with a brief description of the amount of damage, inland surge and the wind speed expected for each class of hurricane and the partial rating factor associated with each class.

TABLE 5

HURRICANE

| CLASS | PARTIAL RATING FACTOR |
|---|---|
| C1 - No damage to structures. Wind speed 74–95 mph | 0.500 |
| C2 - Minor damage to structures. Wind speed 96–110 mph. | 1.000 |
| C3 - Moderate damage to structures. Storm surge up to 6 miles inland. Wind speed 111–130 mph. | 1.500 |
| C4 - Severe damage to structures. Storm surge up to 8 miles inland. Wind speed 131–155 mph. | 2.000 |
| C5 - Major damage to structures. Storm surge up to 10 miles inland. Wind speed $\geq 156$ mph. | 2.500 |

To calculate the individual hurricane rating factor for a specific county N, the number of hurricanes occurring in the county N for each class, is multiplied by the partial rating factor for each class, respectively. The resulting values are then added together to calculate the individual hurricane rating factor for each county N.

The meteorological condition information database includes the raw data information taken directly from the charts for all the counties N as well as the cumulative rating factor R for each county N. The cumulative rating factor R for each county N is calculated using the following formula:

$$R_N = X_W F_N(W) + X_T F_N(T) + X_L F_N(L) + X_E F_N(E) + X_H F_N(H)$$

In the above equation, N is the county identifier, $R_N$ is the cumulative rating factor R for the county N, X is the weighting factor for the specific meteorological condition and $F_N()$ is the individual rating factor for the meteorological condition in county N; more precisely, $X_W$ is the weighting factor with regard to wind speed, $X_T$ is the weighting factor with regard to tornadoes, $X_L$ is the weighting factor with regard to lightning, $X_E$ is the weighting factor with regard to earthquakes; $X_H$ is the weighting factor for hurricanes; $F_N(W)$ is the individual wind speed rating factor; $F_N(T)$ is the individual tornado rating factor; $F_N(L)$ is the individual lightning rating factor; $F_N(E)$ is the individual earthquake rating factor and $F_N(H)$ is the individual hurricane rating factor. The cumulative rating factor R allows the user to consider all the meteorological conditions when making a determination and also allows the user to compare ratings of different counties N on a 1:1 scale based on all the meteorological conditions. In the preferred embodiment, the individual rating factors $F_N()$ of wind speed, tornado and lightning are all calculated so that for each separate meteorological condition, the individual rating factor $F_N()$ for counties N falling within the average range for the meteorological condition have the same individual rating factor $F_N()$. In the preferred embodiment, the individual rating factor $F_N()$ for counties N falling within the average range for wind speed, tornadoes and lightning is 0.056. The method and apparatus can be adapted to accommodate the needs of a particular user. The database can be narrowed to only include the counties N in which the user operates. Further, the calculation of the cumulative rating factor R can be adjusted by adjusting the weighting factors X assigned to each meteorological condition. In the preferred embodiment, the weighting factor X is 1 for all the meteorological conditions. Therefore, each of the meteorological conditions accounts for ⅕ or 20% of the cumulative rating factor R. However, the weighting factors can be changed in order to give more weight to specific meteorological conditions as deemed necessary by the user. In the preferred embodiment, the weighting factors for each meteorological condition are the same for each county N. By adjusting the weighting factors X, the cumulative rating factor R is able to reflect a rating where the meteorological conditions are not all considered equal. For instance, those users located on the east coast may want the cumulative rating factor R to more heavily reflect the effects of hurricanes in the counties N. This would be accomplished by assigning a weighting factor to hurricanes $X_H$ of >1. Thus, the individual rating factor $F_N(H)$ for hurricanes would count for more than 20% of the cumulative rating factor R. Contrastly, those users who do not consider hurricanes when calculating would assign a weighting factor of $X_H=0$ for hurricanes. Thus, hurricanes would not be included in the cumulative rating factor R and would play no part in the rating determination. In the preferred embodiment, the cumulative rating factor R has a range of −0.17 to 12.97.

Figure 23:
Figure 25:
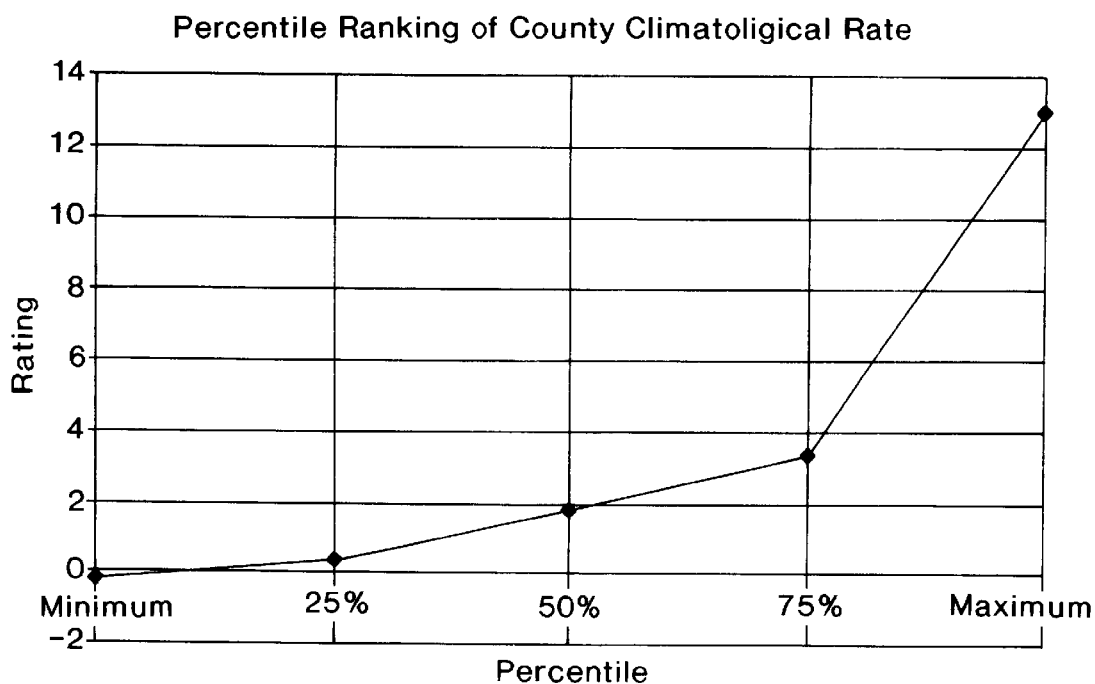

Preferably, for the 3001 counties currently there are 261 counties with a ranking less than 0, 726 Counties with a ranking between 0 and 0.099, 1,523 Counties with a ranking between 0.1 and 0.75, 176 Counties with a ranking between 0.76 and 1.0, 286 Counties with a ranking between 1.001 and 3.0, 101 Counties with a ranking between 3.001 and 7.0, 18 Counties with a ranking between 7.001 and 10.0 and 10 Counties with a ranking greater than 10.001. However, the range will fluctuate as the meteorological condition information database is updated each year and as the cumulative rating factor R equation is customized for a particular user. In the preferred embodiment, the 50 percentile cumulative rating factor R, after duplicates are removed, is 1.75. FIG. 22 shows the percentage of counties N verses the cumulative rating factors R. FIG. 23 gives a listing of number of counties N in various ranges of cumulative rating factors R.

In the preferred embodiment, the meteorological condition information database also contains information on the terrain of the county N and the number of freeze days per year for each county N. The terrain has the following rating scale:

F—Flat land. Characterized by changes in ground elevation above mean sea level of 1000 feet or less in a 20 mile radius.

H—Hilly. Characterized by changes in ground elevation above means sea level of up to 2000 feet in a 20 mile radius.

R—Rolling. Characterized by changes in ground elevation above means sea level of up to 1000 feet over a 20 mile radius.

M—Mountainous. Characterized by changes in ground elevation of up to 1000 feet in a six mile radius.

T—High Mountainous. Characterized by drastic changes in ground elevation of up to 5000 feet in a 20 mile radius.

However, the terrain and the freeze day listings are not used in the calculation of the cumulative rating factor R. Further, the database can also contain information on the population of each county N. The terrain, freeze days and population information is preferably displayed on the output unit 104 along with the cumulative rating factor R and the raw data information and can be used to decide the overall rating of the county N.

Preferably, the client database and the liability database are already formed and in use by the user for other aspects of its business prior to implementation of the system 100. The method and apparatus of the present invention preferably interfaces with the existing client and liability databases of the user. However, the client database and the liability database can be formed specifically for use in the present system 100. In the preferred embodiment, the client database includes a list of all the clients of the user including relevant data for each client. In particular, the database includes the clients name, address, location of insured property by county, amount of insured property and amount of insurance on the property. Preferably, the liability database includes the gross and net limits of liability held by the user in each county N. In an alternative embodiment, a liability database is not used.

IN USE

In the preferred embodiment, the method and apparatus are used to determine the ratings of different geographical areas or counties N based on the severity and/or frequency of several different meteorological conditions. The ratings of the geographical areas or counties N are then used to determine the risk potential in a certain geographical area N due to meteorological conditions. In the preferred embodiment, the risk potential is then used to decide whether or not or for how much to insure a physical structure in a specific geographical area or county N. However, the method and apparatus could also be used by tourism and recreation bureaus, architects, engineers, communication services, government units, planning and urban developers, agricultural services, farmers and industries particularly to plan plant locations. To use the method and apparatus to determine the rating of a county N or other geographical area N, the raw data charts representing each meteorological condition are compiled (FIGS. 2 to 6). Next, the raw data information from the charts indicating the severity and/or frequency of the meteorological conditions in each county N is retrieved from the charts into the meteorological condition information database. Next, the raw data information is manipulated as described above for each of the meteorological conditions to determine the individual rating factor $F_N()$ for each meteorological condition for each county N. Next, all the individual rating factors $F_N()$ for a single county N are calculated together to get the cumulative rating factor R for that county N. The cumulative rating factor R is then stored along with the raw data information for each county N in the meteorological condition information database. The meteorological condition information database is stored in the storage media 108 used with the meteorological condition information system 100. In the preferred embodiment, the client database and the liability database are provided on a separate storage media 110 which is also part of the meteorological information system 100.

Figure 7:
FIG. 7 is the start up screen 10 created by the central processing unit 106 of the meteorological condition information system 100.
Figure 8:
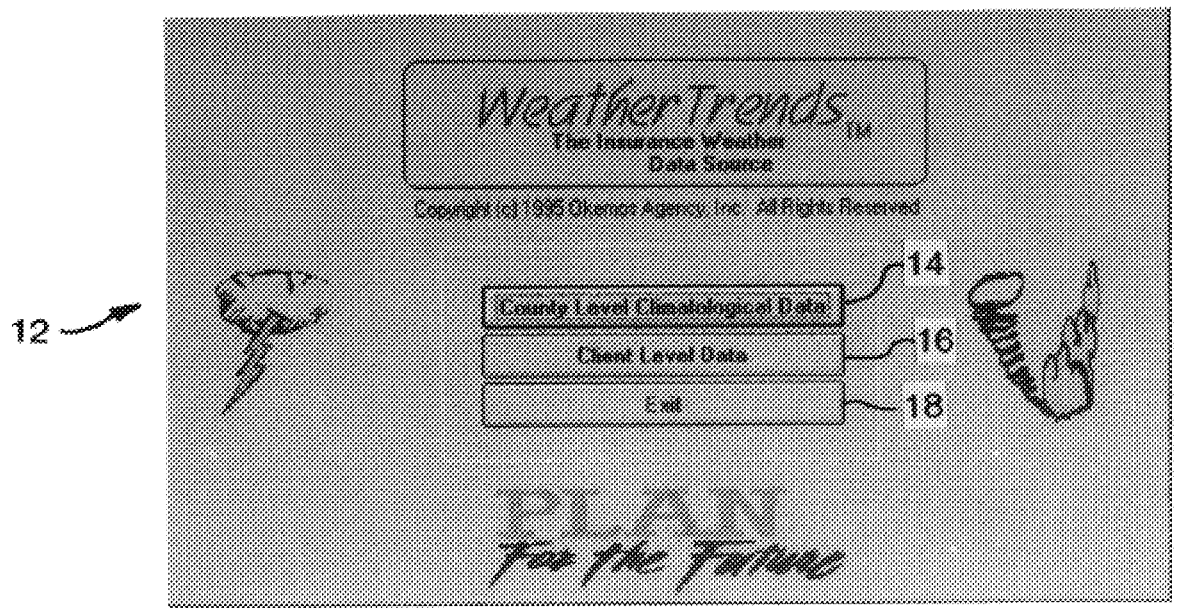
FIG. 8 is the opening screen 12 which allows the user to select how to proceed.
Figure 9:
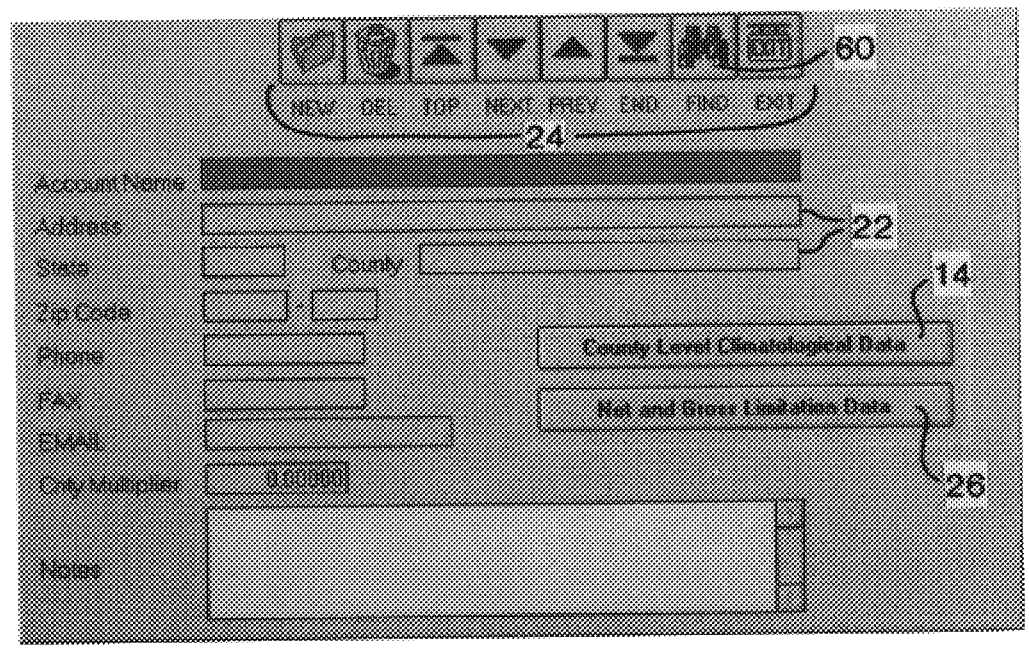
FIG. 9 is the client information screen 20 generated for reviewing the information in the client information database.
Figure 10:
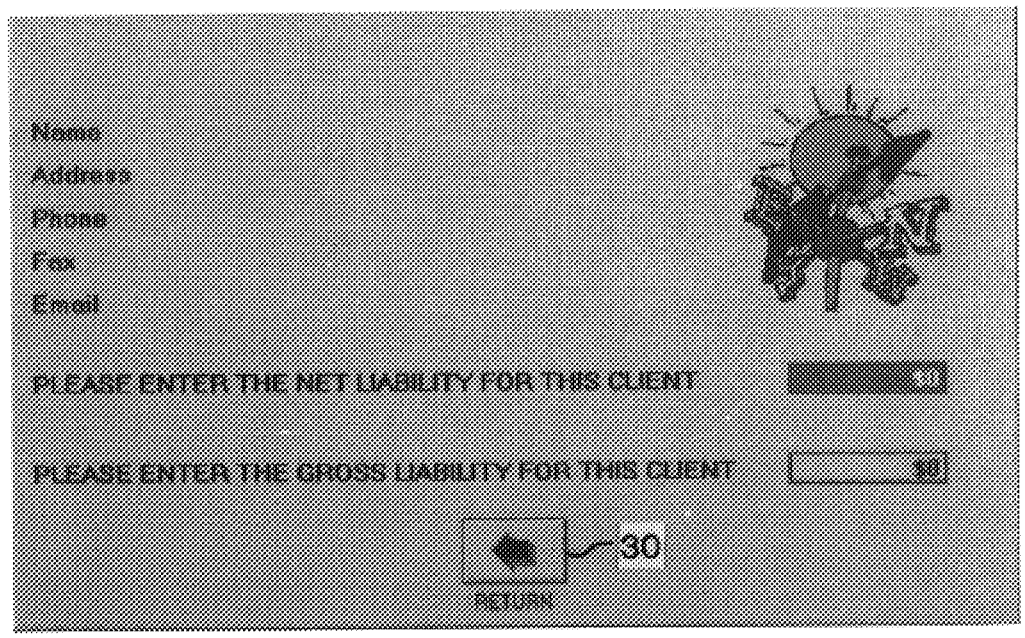
FIG. 10 is the gross and net liability screen 28.

In the preferred embodiment, the method and apparatus uses a Windows based program to interface with the user. Preferably, the computer program is written as a series of subprograms. The computer program is preferably written using a developers tool such as FOXPRO® manufactured by MICROSOFT®. The program is included as Appendix B. FIGS. 6 to 21 show the various screens which the computer program creates. To use the system 100, the user runs the computer program such that the start up screen 10 appears (FIG. 7). In the preferred embodiment, the program automatically moves to the opening screen 12 after the start up screen 10 appears for approximately 5 seconds. Preferably, the opening screen 12 has three selection buttons, the County Level Climatological Data button 14, the Client Level Data button 16 and the Exit button 18 (FIG. 3). The Exit button 18 is self-explanatory and allows the user to exit the program. The Client Level Data button 16 allows the user to enter the client information database. FIG. 9 shows the client information screen 20 for the client information database. When adding new clients, the user merely fills in the blanks 22 on the screen 20. The user can also use the various search buttons 24 on the top of the screen 20 to search for, review and revise existing records. The client information screen 20 also has a County Level Climatological Data button 14 and a Net and Gross Limitation Data button 26. The Net and Gross Limitation Data button 26 opens the gross and net limits screen 28 (FIG. 10). The screen 28 allows the user to search, review and revise information in the liability database for each client. The gross and net limits screen 28 has a Return button 30 which returns the user to the previous screen which is preferably the client information screen 20.

Figure 11:
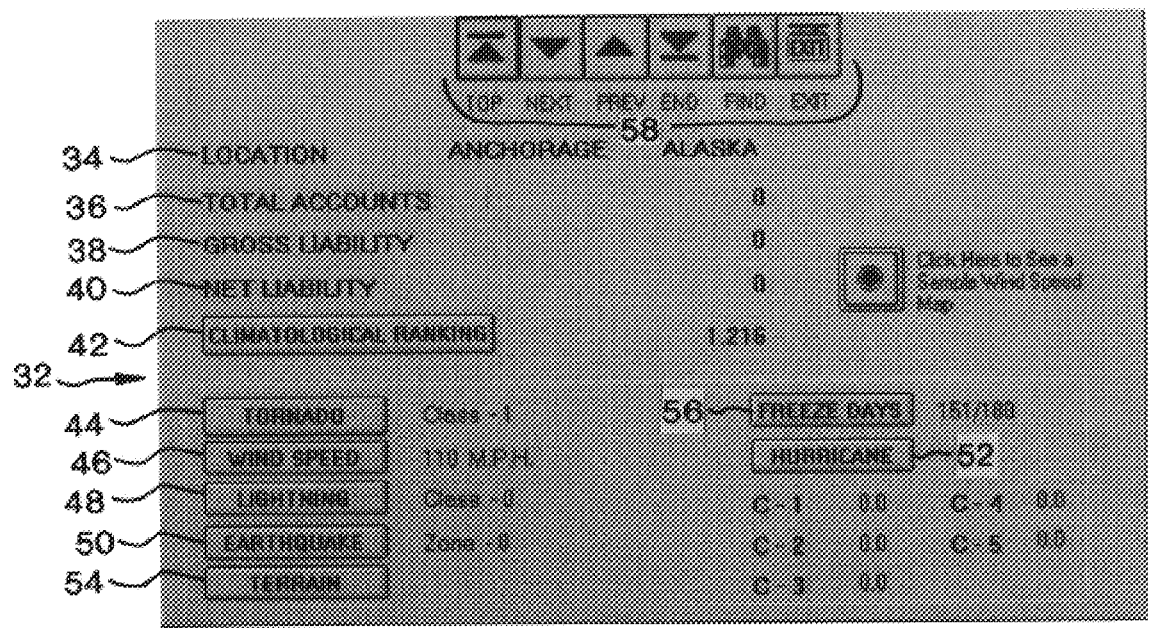
FIG. 11 is the meteorological information screen 32 for reviewing information in the meteorological condition information database for each county N.
Figure 12:
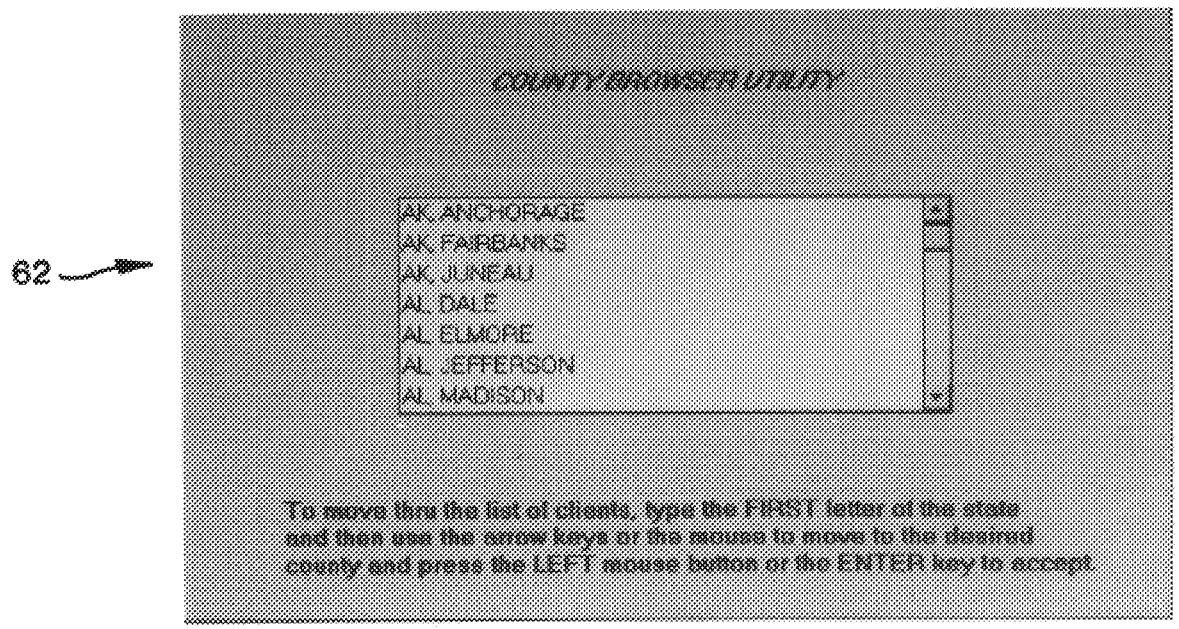
FIG. 12 is the browser screen 62.
Figure 13:
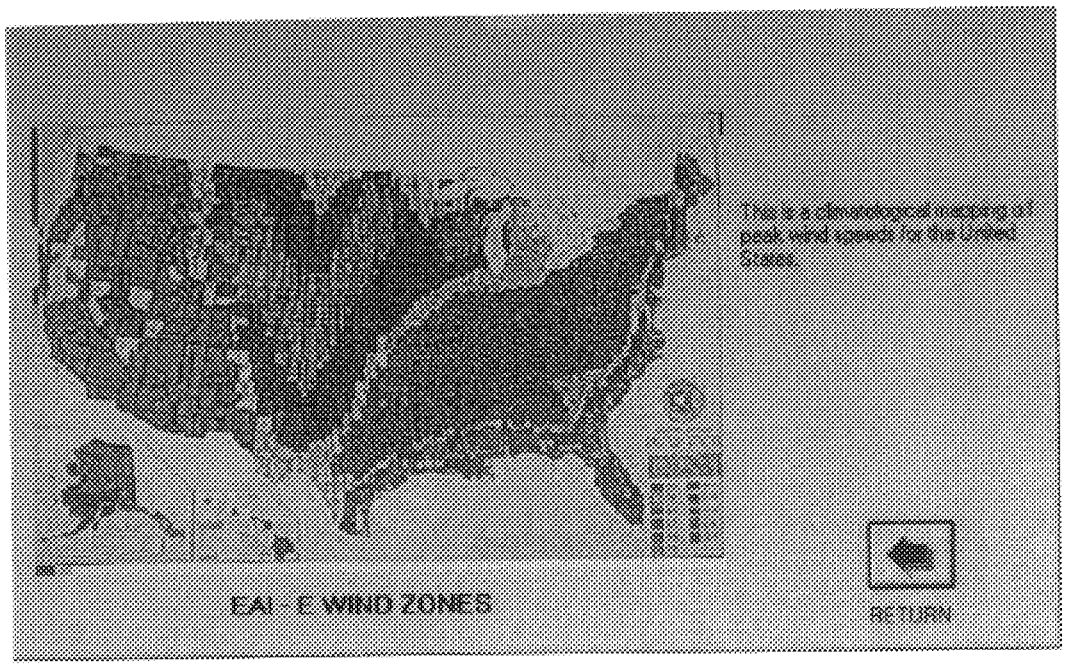
FIG. 13 is the wind speed map screen 60.
Figure 14:

The County Level Climatological Data button 14 on either the opening screen 12 or the client information screen 20 allows the user to review the meteorological data for the counties N. FIG. 11 shows the meteorological information screen 32 for reviewing the meteorological data for each county N. From the county screen 32, the user is able to move through the county records in the meteorological condition information database one at a time or is able to search for a new record using the browse buttons 58 at the top of the screen 32. To find a particular county listing, the user selects the find button 60 which opens the browser screen 62 (FIG. 12). The screen 62 allows the user to move through the counties N one at a time in alphabetical order or to go to a specific county N by typing the first letter of the state in which the county N is located. In the preferred embodiment, the meteorological condition information database is arranged in alphabetical order by county and by state. In the preferred embodiment, if an invalid county N is entered, the program displays the closest county N in the same state. If both the state and the county N are incorrect, the program displays the beginning of the county and state list. When the user has located the correct county N, the user selects the county N which opens the meteorological information screen for that county N. The meteorological information screen 32 lists the county N and state (location) and the total accounts the user has in the county N (Total Accounts) 36, the Gross Liability and the Net Liability the user has in the county N (Gross Liability) 38 and (Net Liability) 40, respectively, and the cumulative rating factor R (climatological ranking) 42 for the county N. The meteorological information screen 32 also shows the raw data information ratings for each of the meteorological conditions, namely tornado 44, wind speed 46, lightning 48, earthquake 50 and hurricane 52. The screen 32 also shows the terrain rating 54 and the freeze days rating 56 for the county N. In the preferred embodiment, the screen 32 also has a sample wind speed map button 58 which pulls up a sample wind zones map screen 60 (FIG. 13). The wind zones map screen 60 has a return button 62 to enable the user to return to the meteorological information screen 32. In the preferred embodiment, the user uses the information on the county screen 32, particularly the cumulative rating factor R, to determine the risk potential in that county N. Preferably, the risk potential is then used to determine whether or not or for how much to insure a physical structure in a specific county N. The user is also able to exit from the program from this screen. At any time during the use of the program, the user is able to activate and enter a help program. The user enters the help file by selecting any of the following climatological ranking 42, tornado 44, wind speed 46, lightning 48, earthquake 50, terrain 54, freeze days 56 and hurricane 52. FIGS. 13 and 22 show the various screens of the help program. The help program allows the user to obtain information on any of the meteorological conditions. In particular, the screens show the selected ranges of the raw data information for the meteorological conditions and also information on how the raw data information is calculated for each meteorological condition.

It is intended that the foregoing description be only illustrative of the present invention and that the present invention be limited only by the hereinafter appended claims.

```
************************************************************
*Program Name: RATE.PRG
*Description: This program will calculate a
*climatological factor for every** county in the United
*States. This factor is based upon wind speed.lighting,
*tornados, earthquake, and hurricanes. Hurricanes will
*evalute both frequency and severity of the storm when
*contributing to the factor.
************************************************************
CLOSE DATA
CLEAR MEMORY
PUBLIC LnRate
LnRate = 0
SELECT 0
USE C:\weather\exe\weather ORDER TAG ckey ALIAS weath
REPLACE ALL crate WITH 0
SCAN
```

```
DO CASE
    CASE wind <= 70
        Lnrate = -.056
    CASE wind <= 75
        Lnrate = 0
    CASE wind <= 80
        Lnrate = .056
    CASE wind <= 85
        Lnrate = .069
    CASE wind <= 90
        Lnrate = .083
    CASE wind <= 95
        Lnrate = .166
    CASE wind <= 100
        Lnrate = .332
    CASE wind <= 105
        Lnrate = .664
    CASE wind <= 110
        Lnrate = 1.328
    CASE wind <= 115
        Lnrate = 1.994
    CASE wind <= 120
        Lnrate = 2.66
    CASE wind <= 125
        Lnrate = 3.316
    CASE wind <= 130
        Lnrate = 3.982
    CASE wind <= 135
        Lnrate = 4.648
    CASE wind <= 140
        Lnrate = 5.314
    OTHERWISE
        LnRate = 6.002
ENDCASE
DO CASE
    CASE tornado < .5
        Lnrate = Lnrate - .056
    CASE tornado < 1
        Lnrate = Lnrate - .028
    CASE tornado < 2
        Lnrate = Lnrate + 0
    CASE tornado < 3
        Lnrate = Lnrate + .056
    CASE tornado < 4
        Lnrate = Lnrate + .069
    CASE tornado < 5
        Lnrate = Lnrate + .083
    CASE tornado < 6
        Lnrate = Lnrate + .166
    CASE tornado < 7
        Lnrate = Lnrate + .332
    CASE tornado < 8
        Lnrate = Lnrate + .644
    CASE tornado < 9
        Lnrate = Lnrate + 1.328
    CASE tornado < 10
        Lnrate = Lnrate + 1.992
    OTHERWISE
        Lnrate = Lnrate + 2.656
ENDCASE
DO CASE
    CASE lightning < 1
        Lnrate = Lnrate - .056
    CASE lightning < 2
        Lnrate = Lnrate - .028
    CASE lightning < 3
        Lnrate = Lnrate - .028
    CASE lightning < 4
        Lnrate = Lnrate + 0
    CASE lightning < 5
        Lnrate = Lnrate + .056
    CASE lightning < 6
        Lnrate = Lnrate + .069
    CASE lightning < 7
        Lnrate = Lnrate + .083
    CASE lightning < 8
        Lnrate = Lnrate + .097
    CASE lightning < 9
        Lnrate = Lnrate + .111
    CASE lightning < 10
        Lnrate = Lnrate + 1.139
    OTHERWISE
        Lnrate = Lnrate + 1.157
ENDCASE
DO CASE
    CASE earthquake > 3
        Lnrate = LnRate + 2
    CASE earthquake > 2
        LnRate = LnRate + 1
    CASE earthquake > 1
        LnRate = LnRate + .025
    CASE earthquake > 0
        LnRate = LnRate + .01
ENDCASE
Lnrate = Lnrate + hurricane
REPLACE crate WITH LnRate
LnRate = 0
ENDSCAN
sele min(crate), max(crate), avg(crate) from weath into
cursor tmp1
**      HADD
CLOSE DATA
CLEAR MEMORY
CLEAR ALL
CLOSE ALL
SET DEFA TO C:\weather\exe
SELECT 0
USE weather ORDER TAG ckey alias WT
REPLACE ALL hurricane with 0
REPLACE ALL c1 with 0
REPLACE ALL c2 with 0
REPLACE ALL c3 with 0
REPLACE ALL c4 with 0
REPLACE ALL c5 with 0
SELECT 0
USE hurricane ORDER TAG ckey ALIAS HR
SCAN
        SELE WT
    SEEK HR.ckey
    IF FOUND()
        REPLACE WT.c1 WITH HR.c1
        REPLACE WT.c2 WITH HR.c2
        REPLACE WT.c3 WITH HR.c3
        REPLACE WT.c4 WITH HR.c4
        REPLACE WT.c5 WITH HR.c5
        REPLACE WT.hurricane WITH ((HR.c1*.5)+(HR.c2*1)+;
            (HR.c3*1.5)+(HR.c4*2)+(HR.c5*2.5))
    ENDIF
    SELE HR
ENDSCAN
DO RATE.PRG
```

We claim:

1. A method for ranking geographical areas based on a plurality of meteorological conditions, which comprises:

(a) providing a meteorological chart of the geographical areas for each of the meteorological conditions to be ranked, each chart showing a severity and/or frequency of the meteorological condition in each of the geographical areas;

(b) selecting ranges of the severities and/or frequencies of the meteorological condition for all of the geographical areas;

(c) calculating rating factors for each of the ranges of severities and/or frequencies of the meteorological condition;

(d) determining the individual rating factor for each of the geographical areas for each of the meteorological conditions;

(e) calculating a cumulative rating factor for each of the geographical areas using the individual rating factors for each of the meteorological conditions for the geographical area; and (f) ranking the geographical areas based on the cumulative rating factors of each of the geographical areas.

2. The method of claim 1 wherein the cumulative rating factor is a summation of the individual rating factors for each meteorological condition.

3. The method of claim 1 wherein when the severity and/or frequency of the meteorological condition is zero, in the geographical area, the individual rating factor for the geographical area for the meteorological condition is zero.

4. The method of claim 1 wherein the meteorological conditions are selected from the group of wind, tornado, lightning, hurricane, earthquake, freeze days, temperature and precipitation.

5. The method of claim 1 wherein one of the meteorological conditions is wind.

6. The method of claim 5 wherein the individual rating factor for wind in between −0.056 to +6.002.

7. The method of claim 5 wherein the severity and/or frequency of wind in the geographical area is determined based on peak winds over the past ten years in the geographical area.

8. The method of claim 8 wherein the ranges of severity and/or frequency of the wind are 0 to 70 MPH; 71 to 75 MPH; 76 to 80 MPH; 81 to 85 MPH; 86 to 90 MPH; 91 to 95 MPH; 96 to 100 MPH; 101 to 105 MPH; 106 to 110 MPH; 111 to 115 MPH; 116 to 120 MPH; 121 to 125 MPH; 126 to 130 MPH; 131 to 135 MPH; and 136 to 140 MPH and greater than 140 MPH.

9. The method of claim 9 wherein the individual rating factors for each range of severity and/or frequency of wind are:

```
0 to 70 MPH = −0.056
71 to 75 MPH = 0.000
76 to 80 MPH = 0.056
81 to 85 MPH = 0.069
86 to 90 MPH = 0.083
91 to 95 MPH = 0.166
96 to 100 MPH = 0.332
101 to 105 MPH = 0.664
106 to 110 MPH = 1.328
111 to 115 MPH = 1.994
116 to 120 MPH = 2.660
121 to 125 MPH = 3.316
126 to 130 MPH = 3.982
131 to 135 MPH = 4.648
136 to 140 MPH = 5.314
>140 MPH = 6.002
```

10. The method of claim 1 wherein one of the meteorological conditions is tornadoes.

11. The method of claim 10 wherein the individual rating factor for tornadoes is between −0.056 to 2.656.

12. The method of claim 10 wherein the severity and/or frequency of tornadoes in the geographical area is determined based on the number of tornadoes in the geographical area per 10,000 square miles averaged over the past ten years.

13. The method of claim 12 wherein the ranges of severity and/or frequency of the tornadoes are:

```
0.000–0.499
0.500–0.999
1.000–1.999
2.000–2.999
3.000–3.999
4.000–4.999
5.000–5.999
6.000–6.999
7.000–7.999
8.000–8.999
9.000–9.999
≧10.000
```

14. The method of claim 13 wherein the individual rating factors for each range of severity and/or frequency of tornadoes are:

```
0.000–0.499 = −0.056
0.500–0.999 = −0.028
1.000–1.999 = 0.000
2.000–2.999 = 0.056
3.000–3.999 = 0.069
4.000–4.999 = 0.083
5.000–5.999 = 0.166
6.000–6.999 = 0.332
7.000–7.999 = 0.644
8.000–8.999 = 1.328
9.000–9.999 = 1.992
≧10.000 = 2.656
```

15. The method of claim 1 wherein one of the meteorological conditions is lightning.

16. The method of claim 15 wherein the individual rating factor for lightning is between −0.056 to 1.157.

17. The method of claim 15 wherein the severity and/or frequency of lightning of the geographical area is determined based on the number of thunderstorm days per year in the geographical area.

18. The method of claim 17 wherein the ranges of severity and/or frequency of lightning are:

```
0.000–0.999 = 0–10 Thunderstorm days per year
1.000–1.999 = 11–20 Thunderstorm days per year
2.000–2.999 = 21–30 Thunderstorm days per year
3.000–3.999 = 31–40 Thunderstorm days per year
4.000–4.999 = 41–50 Thunderstorm days per year
5.000–5.999 = 51–60 Thunderstorm days per year
6.000–6.999 = 61–70 Thunderstorm days per year
7.000–7.999 = 71–80 Thunderstorm days per year
8.000–8.999 = 81–90 Thunderstorm days per year
9.000–9.999 = 91–100 Thunderstorm days per year
10.000+ = 101–110 Thunderstorm days per year
```

19. The method of claim 18 wherein the individual rating factors for each range of severity and/or frequency of lightning are:

```
0.000–0.999 = −0.056
1.000–1.999 = −0.028
2.000–2.999 = −0.028
3.000–3.999 = 0.000
4.000–4.999 = 0.056
5.000–5.999 = 0.069
6.000–6.999 = 0.083
7.000–7.999 = 0.097
8.000–8.999 = 0.111
9.000–9.999 = 1.139
10.000+ = 1.157
```

20. The method of claim 1 wherein one of the meteorological conditions is earthquakes.

21. The method of claim 20 wherein the individual rating factor for earthquakes is between 0.010 to 2.000.

22. The method of claim 20 wherein the ranges of severity and/or frequency of earthquakes are:

| |
|---|
| 0.000–0.999 |
| 1.000–1.999 |
| 2.000–2.999 |
| 3.000+ |

23. The method of claim 22 wherein the individual rating factors for each range of severity and/or frequency of earthquakes are:

| |
|---|
| >0.000 = 0.010 |
| >1.000 = 0.025 |
| >2.000 = 1.000 |
| >3.000 = 2.000 |

24. The method of claim 1 wherein one of the meterological conditions is hurricanes.

25. The method of claim 24 wherein there are five ranges of severity and/or frequency for hurricanes.

26. The method of claim 25 wherein the five ranges of severity and/or frequency for hurricanes are:

| |
|---|
| 74–95 MPH |
| 96–110 MPH |
| 111–130 MPH |
| 131–155 MPH |
| >156    MPH |

27. The method of claim 26 wherein the rating factors for each of the ranges of severities and/or frequencies for hurricanes are:

| |
|---|
| 74–95 MPH = 0.500 |
| 96–110 MPH = 1.000 |
| 111–130 MPH = 1.500 |
| 131–155 MPH = 2.000 |
| >156    MPH = 2.500 |

28. The method of claim 27 wherein the individual rating factor for each of the geographical areas for hurricanes is determined by multiplying the number of hurricanes in each range of severity and/or frequency by the rating factors for that range and then adding the results for all the ranges together.

29. The method of claim 1 wherein a weight associated with each of the individual rating factors for each meteorological condition is adjustable.

30. The method of claim 1 wherein the ranges of the severities and/or frequencies are selected such that the geographical areas are evenly distributed throughout the range.

31. The method of claim 3 wherein the cumulative rating factor for each of the geographical area is calculated using the equation $$R_N = X_W F_N(W) + X_T F_N(T) + X_L F_N(L) + X_E F_N(E) + X_H F_N(H)$$

wherein N is the geographical area $R_N$ is the cumulative rating factor for the geographical area, $F_N(W)$ is a wind rating factor for the geographical area, $F_N(T)$ is a tornado rating factor for the geographical area, $F_N(L)$ is a lightning rating factor for the geographical area, $F_N(E)$ is the earthquake rating factor for the geographical area, $F_N(H)$ is a hurricane rating factor for the geographical area and wherein $X_W$, $X_T$, $X_L$, $X_E$ and $X_H$ are weighting factors for each of the meteorological conditions.

32. The method of claim 1 wherein the geographical areas are counties in all 50 states of the United States.

33. The method of claim 1 wherein the lower the cumulative rating factor for the geographical area the lower the risk of damage in the geographical area as a result of the meteorological conditions.

34. The method of claim 1 wherein a chart having terrain characteristics of the geographical areas is provided and wherein a terrain factor is determined from the chart for the geographical area and wherein the terrain factor is used with the cumulative rating factor in ranking the geographical areas.

35. The method of claim 31 wherein $X_W$, $X_T$, $X_L$, $X_E$ and $X_H$ are equal.

36. The method for determining the insurability of a physical structure located in a geographical area, which comprises:

(a) providing a rating database in a computer having a cumulative rating factor for a plurality of geographical areas wherein the cumulative rating factor is calculated using the equation $$R_N = X_W F_N(W) + X_T F_N(T) + X_L F_N(L) + X_E F_N(E) + X_H F_N(H)$$

wherein N is the geographical area $R_N$ is the cumulative rating factor for the geographical area, $F_N(W)$ is a wind rating factor for the geographical area, $F_N(T)$ is a tornado rating factor for the geographical area, $F_N(L)$ is a lightning rating factor for the geographical area, $F_N(E)$ is the earthquake rating factor for the geographical area, $F_N(H)$ is a hurricane rating factor for the geographical area and wherein $X_W$, $X_T$, $X_L$, $X_E$, and $X_H$ are weighting factors for each of the meteorological condition;

(b) accessing the rating database to retrieve the cumulative rating factor for the geographical area;

(c) providing a rating chart showing the insurability for the cumulative rating factors; and (d) comparing the cumulative rating factor for the geographical area with the rating chart to determine the insurability of the structure located in the geographical area.

37. The method of claim 36 wherein $X_W$, $X_T$, $X_L$, $X_E$ and $X_H$ are equal to 1.

38. The method of claim 36 wherein $X_W$, $X_T$, $X_L$, $X_E$ and $X_H$ are different values in the equation.

39. The method of claim 36 wherein a client database can be generated in the computer to provide a list of clients associated with the geographical areas.

40. The method of claim 39 wherein the rating database is accessed using the client database to determine the insurability of a structure owned by a client in the geographical area.

41. The method of claim 36 wherein a liability database can be generated having a gross liability factor and a net liability factor for the geographical areas wherein the gross liability factor and the limited liability factor are considered with the cumulative rating factor to determine the insurability of the structure in the geographical area.

42. The method of claim 36 wherein the database is formed using a method for ranking geographical areas based on a plurality of meteorological conditions, which includes: providing a meteorological chart, information of the geographical areas for each of the meteorological conditions to be ranked, each showing a severity and/or frequency of the meteorological condition in each of the geographical areas; selecting ranges of the severities and/or frequencies of the meteorological condition for all of the geographical areas; calculating individual rating factors for each of the ranges of severities and/or frequencies of the meteorological condition; determining the individual rating factor for each of the geographical areas for each of the meteorological conditions; and calculating a cumulative rating factor for each of the geographical areas using the equation.

43. The method of claim 36 wherein the lower the cumulative rating factor for the geographical area the greater the insurability.

44. The method for determining the insurability of a physical structure located in a geographical area from a database, which comprises:

(a) providing a plurality of charts, each chart having information relating to a severity and/or frequency of a meteorological condition for a plurality of geographical areas;

(b) selecting a range of rating factors representing the severities and/or frequencies of each meteorological condition for the plurality of geographical areas;

(c) calculating a rating factor for each geographical area for each meteorological condition;

(d) combining the rating factors for each of the meteorological conditions for each of the geographical areas to provide a cumulative rating factor for each of the geographical areas;

(e) inputting the geographical areas and the corresponding cumulative rating factors into a computer to form the database;

(f) forming a chart showing an amount of for the cumulative rating factors;

(g) retrieving the cumulative rating factor from the database for the geographical area where the structure is located; and (h) comparing the cumulative rating factor for the geographical area with the chart to determine the amount of for the geographical area.

45. A media operational for use in storing a database for use in a method for determining the insurability of a physical structure located in a geographical area, which comprises: providing a database on the media having a cumulative rating factor for a plurality of geographical areas wherein the cumulative rating factor is calculated using the equation $$R_N = X_W F_N(W) + X_T F_N(T) + X_L F_N(L) + X_E F_N(E) + X_H F_N(H)$$

wherein N is the geographical area $R_N$ is the rating factor for the geographical area, $F_N(W)$ is a wind rating factor for the geographical area, $F_N(T)$ is a tornado rating factor for the geographical area, $F_N(L)$ is a lightning rating factor for the geographical area, $F_N(E)$ is the earthquake rating factor for the geographical area, $F_N(H)$ is a hurricane rating factor for the geographical area and $X_W$, $X_T$, $X_L$, $X_E$ and $X_H$ are weighting factors for each of the meteorological conditions; accessing the database to retrieve the cumulative rating factor for the geographical area; providing a rating chart showing the insurability for the cumulative rating factors; and comparing the cumulative rating factor for the geographical area with the rating chart to determine the insurability of the structure located in the geographical area.

* * * * *